United States Patent
Shih et al.

(10) Patent No.: US 11,822,092 B2
(45) Date of Patent: Nov. 21, 2023

(54) HEAD-MOUNTED DISPLAY AND ADJUSTMENT OF HEAD BELT

(71) Applicant: Acer Incorporated, New Taipei (TW)

(72) Inventors: Yu-Cheng Shih, New Taipei (TW); Chih-Heng Tsou, New Taipei (TW); Yen-Chou Chueh, New Taipei (TW); Wei-Chih Wang, New Taipei (TW); Hui-Ping Sun, New Taipei (TW); Chun-Hsien Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 10 days.

(21) Appl. No.: 17/321,516

(22) Filed: May 17, 2021

(65) Prior Publication Data

US 2022/0334398 A1 Oct. 20, 2022

(30) Foreign Application Priority Data

Apr. 20, 2021 (TW) ................................. 110114133

(51) Int. Cl.
*G02B 27/01* (2006.01)

(52) U.S. Cl.
CPC .. *G02B 27/0176* (2013.01); *G02B 2027/0154* (2013.01); *G02B 2027/0161* (2013.01); *G02B 2027/0178* (2013.01)

(58) Field of Classification Search
CPC .... G02B 2027/0154; G02B 2027/0161; G02B 2710/0149
See application file for complete search history.

(56) References Cited

U.S. PATENT DOCUMENTS

| 7,565,704 | B2* | 7/2009 | Wu | A42B 3/145 2/418 |
| 2009/0128450 | A1* | 5/2009 | Nakabayashi | G02B 27/0176 345/8 |
| 2011/0265254 | A1* | 11/2011 | Ma | A61H 7/006 2/420 |
| 2020/0042035 | A1* | 2/2020 | Chen | G06F 1/163 |
| 2021/0149205 | A1* | 5/2021 | Jen | G02B 7/002 |
| 2021/0297520 | A1* | 9/2021 | Takada | H04M 1/6091 |
| 2022/0187609 | A1* | 6/2022 | Snyder | G02B 27/0176 |

FOREIGN PATENT DOCUMENTS

| EP | 0942307 | 9/1999 |
| TW | I660200 | 5/2019 |
| TW | 202010422 | 3/2020 |

* cited by examiner

*Primary Examiner* — Towfiq Elahi
*Assistant Examiner* — Bipin Gyawali
(74) *Attorney, Agent, or Firm* — JCIPRNET

(57) ABSTRACT

A head-mounted display includes a display host, a head belt base, a first lateral head belt, a second lateral head belt, an auxiliary head belt, a knob, a first driving component and a second driving component. The head belt base is connected to the display host through the first and second lateral head belts and the auxiliary head belt. The knob is pivoted to the head belt base, and the knob is coupled to the first and second lateral head belts through the first driving component and is coupled to the auxiliary head belt through the second driving component. The knob synchronously drives the first and second driving components, to drive the first and second lateral head belts through the first driving component and drive the auxiliary head belt through the second driving component. Alternatively, the knob drives one of the first driving component and the second driving component.

9 Claims, 5 Drawing Sheets

HEAD-MOUNTED DISPLAY AND ADJUSTMENT OF HEAD BELT

CROSS-REFERENCE TO RELATED APPLICATION

This application claims the priority benefit of Taiwanese application no. 110114133, filed on Apr. 20, 2021. The entirety of the above-mentioned patent application is hereby incorporated by reference herein and made a part of this specification.

BACKGROUND

Technical Field

The disclosure relates to a display device; particularly, the disclosure relates to a head-mounted display.

Description of Related Art

The so-called virtual reality refers to generation of a three-dimensional virtual environment by computer simulation to provide users with simulation on senses such as vision, smell, or touch, for the users to have an immersive sense of presence.

Generally speaking, the users need to wear a head-mounted display to obtain an image screen of the three-dimensional virtual environment. The head-mounted display may be broadly divided into two major parts: a display host and a headband. In addition, the headband may be broadly divided into two lateral head belts passing through the left and right sides of the head of the user, and an auxiliary head belt passing through the top of the head of the user. When wearing the head-mounted display, the user may adjust the tightness depending on personal needs by adjusting the length of the two lateral head belts or the length of the auxiliary head belt. Although the length of the two lateral head belts may be adjusted synchronously through the same adjustment mechanism, the length of the auxiliary head belt requires to be adjusted by another adjustment mechanism. Therefore, where the length of the two lateral head belts and the length of the auxiliary head belt cannot be adjusted synchronously, the user may need to spend more time adjusting the tightness when wearing the head-mounted display.

SUMMARY

The disclosure provides a head-mounted display with excellent operating convenience.

The disclosure proposes a head-mounted display, including a display host, a head belt base, a first lateral head belt, a second lateral head belt, an auxiliary head belt, a knob, a first driving component, and a second driving component. The head belt base is disposed opposite to the display host. One end of the first lateral head belt is slidably disposed on the head belt base, and another end of the first lateral head belt is connected to the display host. One end of the second lateral head belt is slidably disposed on the head belt base and is overlapped with the first lateral head belt, and another end of the second lateral head belt is connected to the display host. One end of the auxiliary head belt is slidably disposed on the head belt base and intersected with the second lateral head belt, and another end of the auxiliary head belt is connected to the display host. The knob is pivoted to the head belt base, and the head belt base is located between the display host and the knob. The first driving component is pivoted to the head belt base and coupled to the first lateral head belt and the second lateral head belt. The first driving component is joined to the knob to be rotated synchronously with the knob, or the first driving component is loosened from the knob to stop being rotated. The second driving component is pivoted to the head belt base and coupled to the auxiliary head belt. The second driving component is joined to the knob to be rotated synchronously with the knob, or the second driving component is loosened from the knob to stop being rotated.

Based on the foregoing, in the head-mounted display of the disclosure, by rotating the knob, the user may synchronously drive the first lateral head belt, the second lateral head belt, and the auxiliary head belt, and synchronously adjust the length of the first lateral head belt, the length of the second lateral head belt, and the length of the auxiliary head belt. Accordingly, the tightness of the head-mounted display when being worn may be adjusted depending on personal needs. Therefore, the head-mounted display of the disclosure has excellent operating convenience.

When the knob cannot drive the first lateral head belt and the second lateral head belt through the first driving component, the first driving component is loosened from the knob, such that the knob may still drive the auxiliary head belt through the second driving component. On the contrary, when the knob cannot drive the auxiliary head belt through the second driving component, the second driving component is loosened from the knob, such that the knob may still drive the first lateral head belt and the second lateral head belt through the first driving component. Based on the above design, if the length (or tightness) of the first lateral head belt and the second lateral head belt has been adjusted, the user may still adjust the length (or tightness) of the auxiliary head belt. On the contrary, if the length (or tightness) of the auxiliary head belt has been adjusted, the user may still adjust the length (or tightness) of the first lateral head belt and the second lateral head belt. In addition, with the above design, it is also possible to prevent damage to the mechanism caused by excessive rotation/adjustment by the user.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
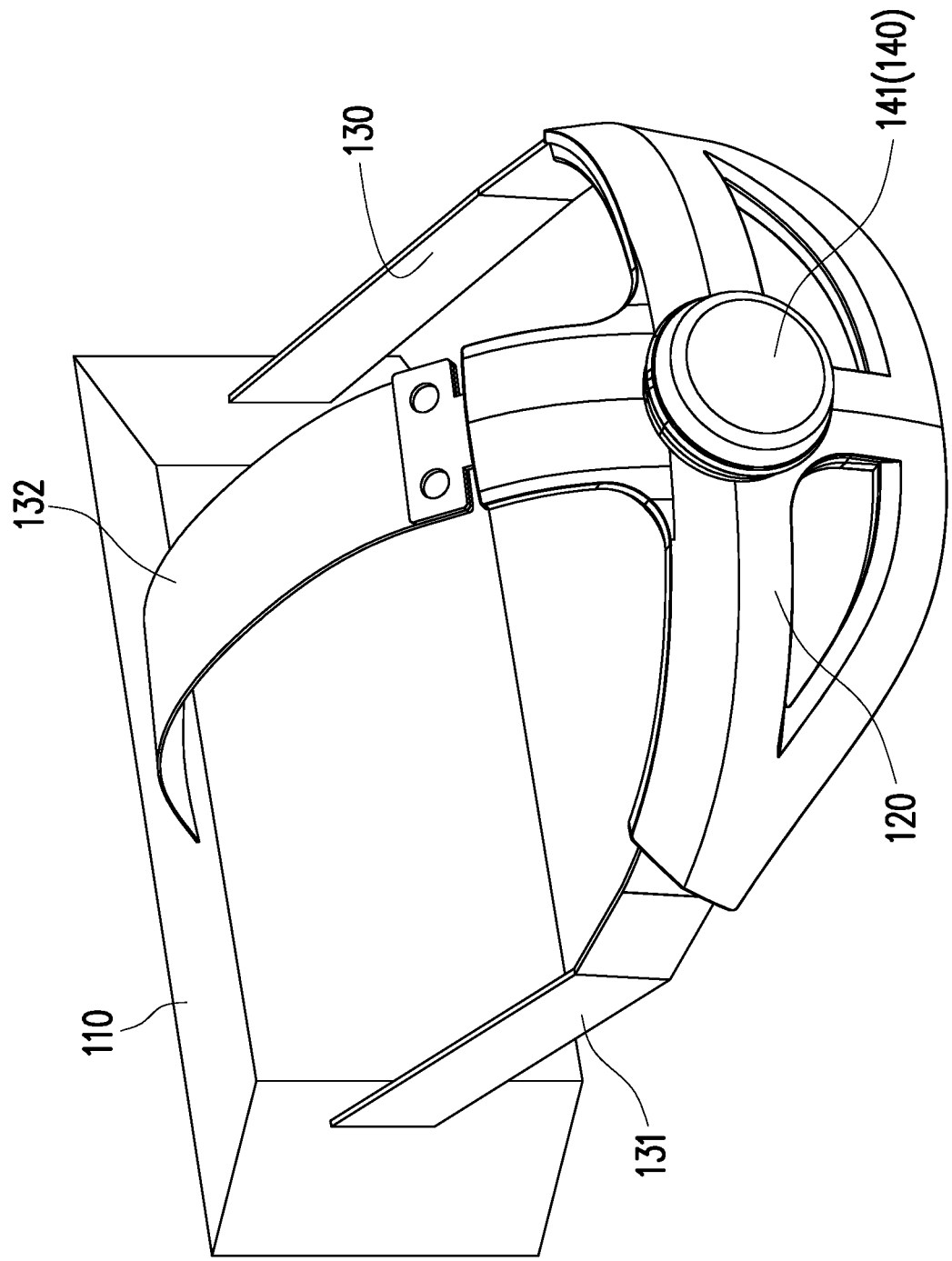
FIG. 1 is a schematic view of a head-mounted display according to an embodiment of the disclosure.
Figure 2:
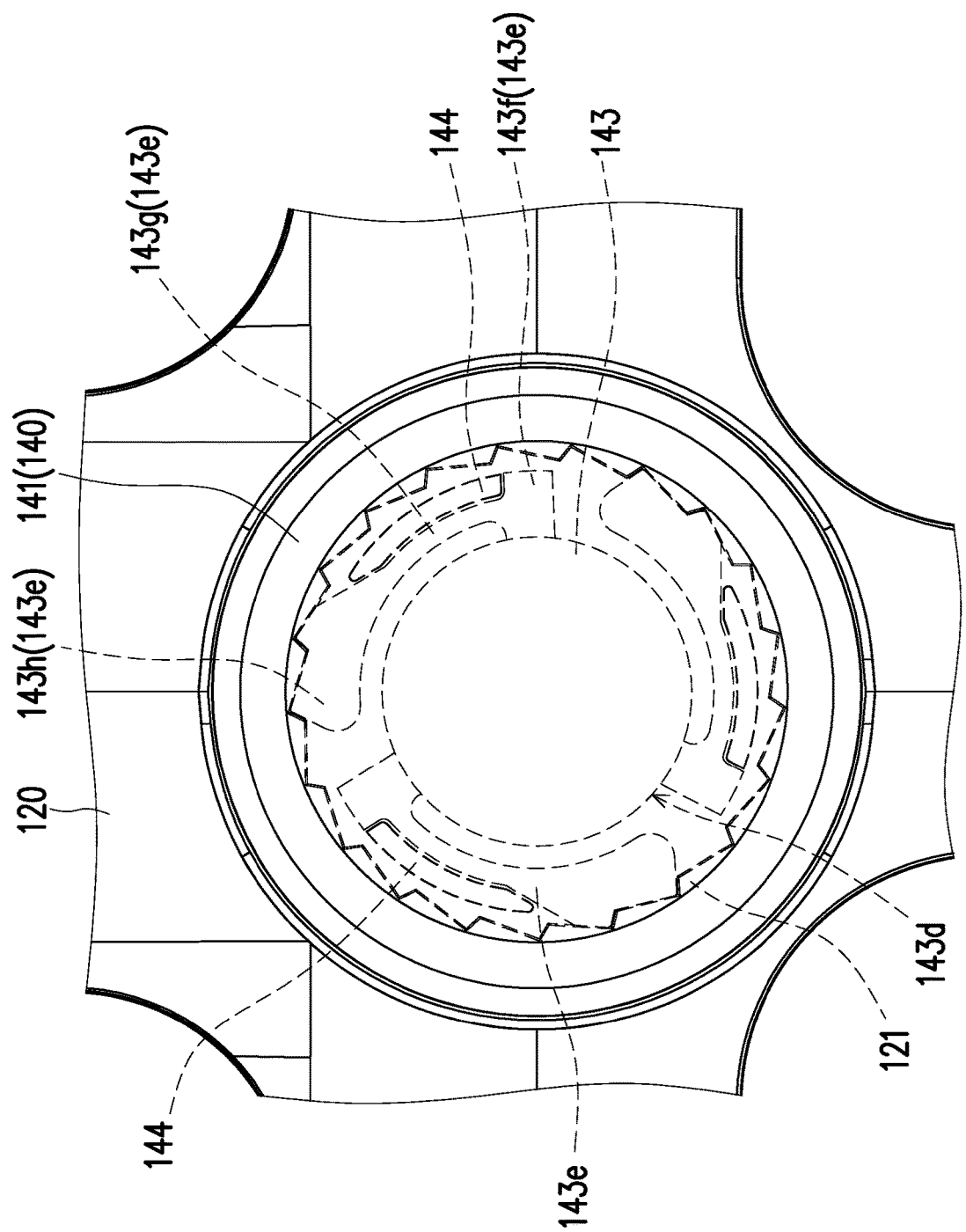
FIG. 2 is a partially enlarged front view corresponding to a location of a knob in FIG. 1.
Figure 3:
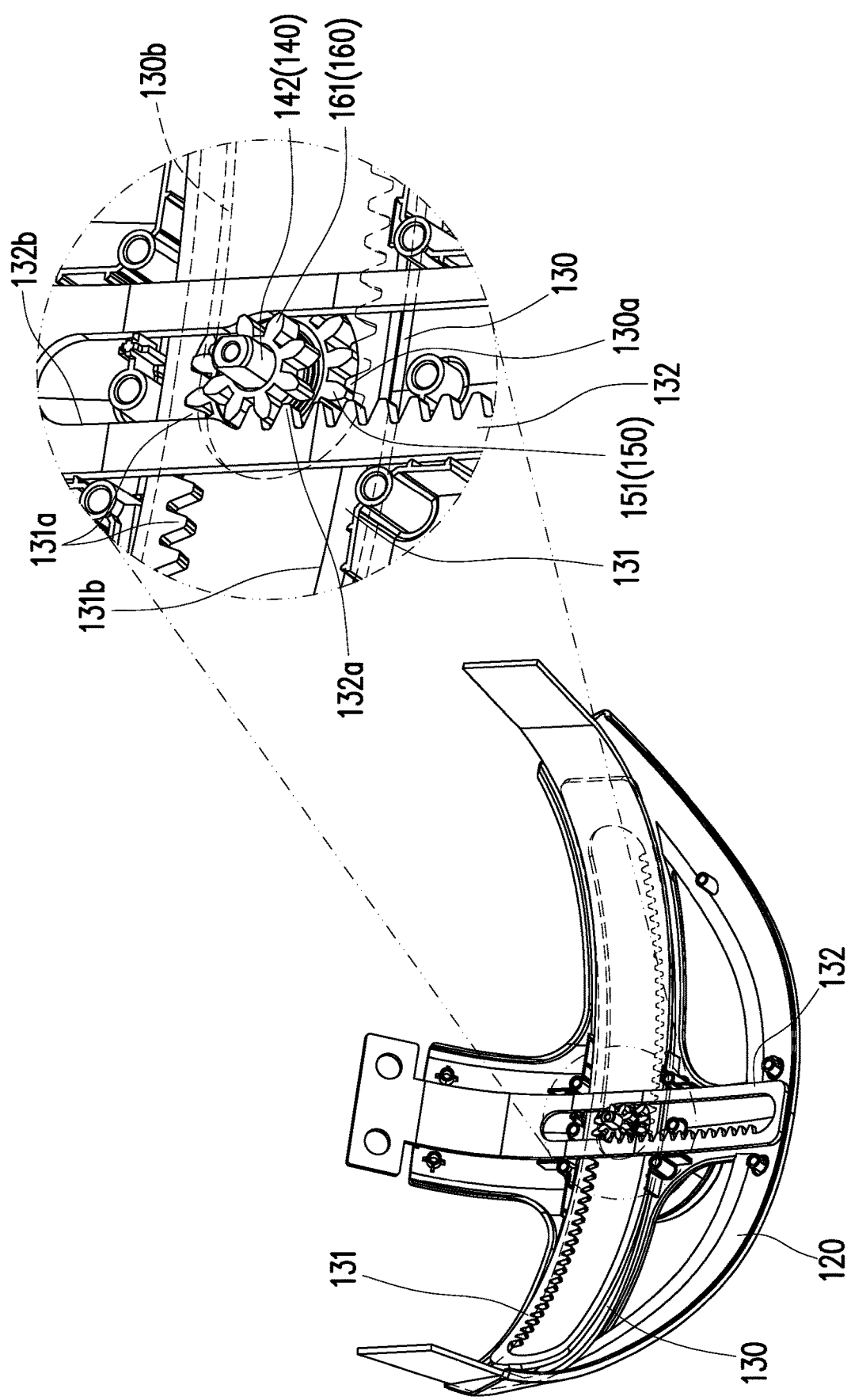
FIG. 3 is a schematic partial view of the head-mounted display of FIG. 1 from another view angle.
Figure 4:
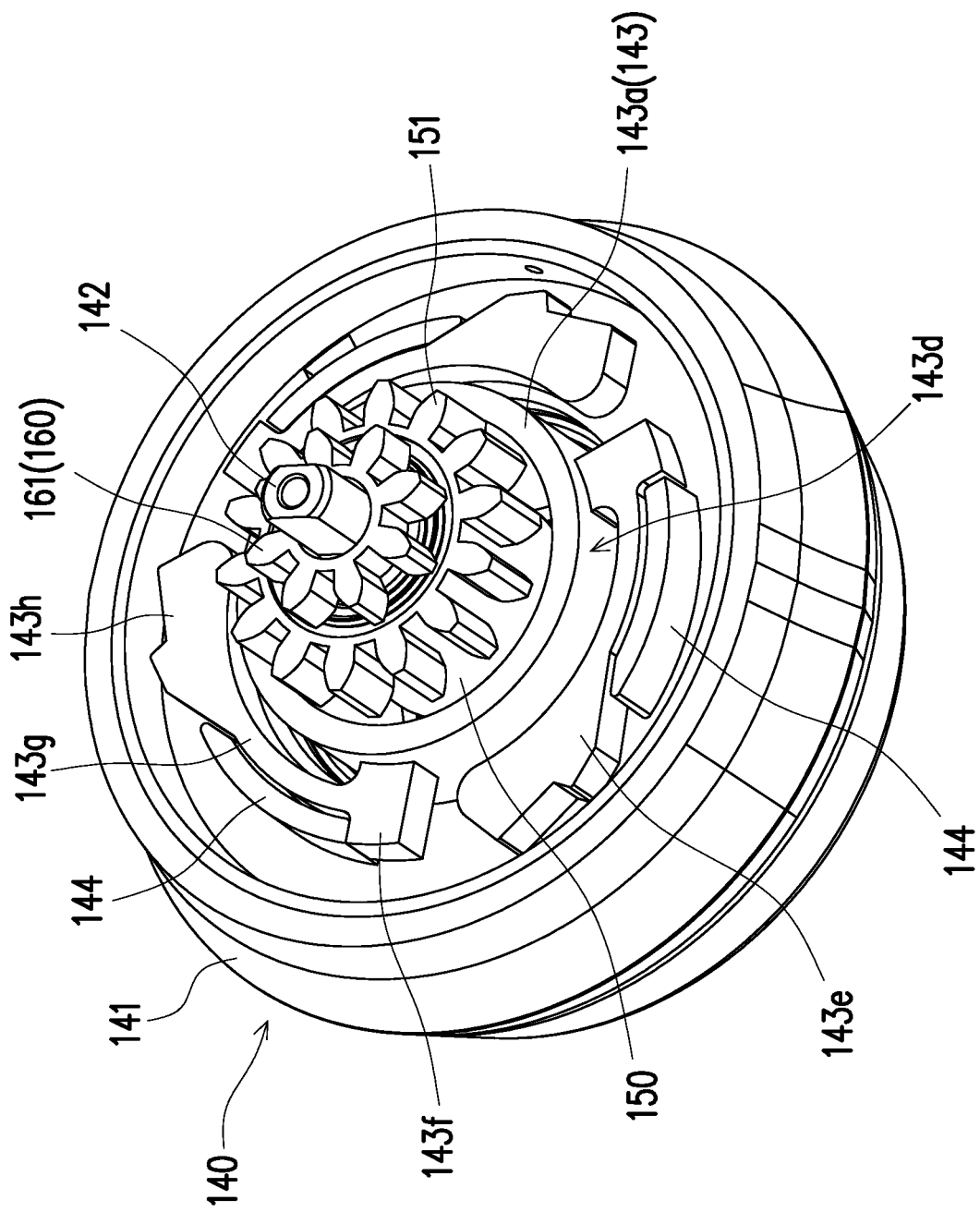
FIG. 4 is an enlarged schematic view of the knob, a first driving component, a second driving component, and a positioning base of FIG. 3.
Figure 5:
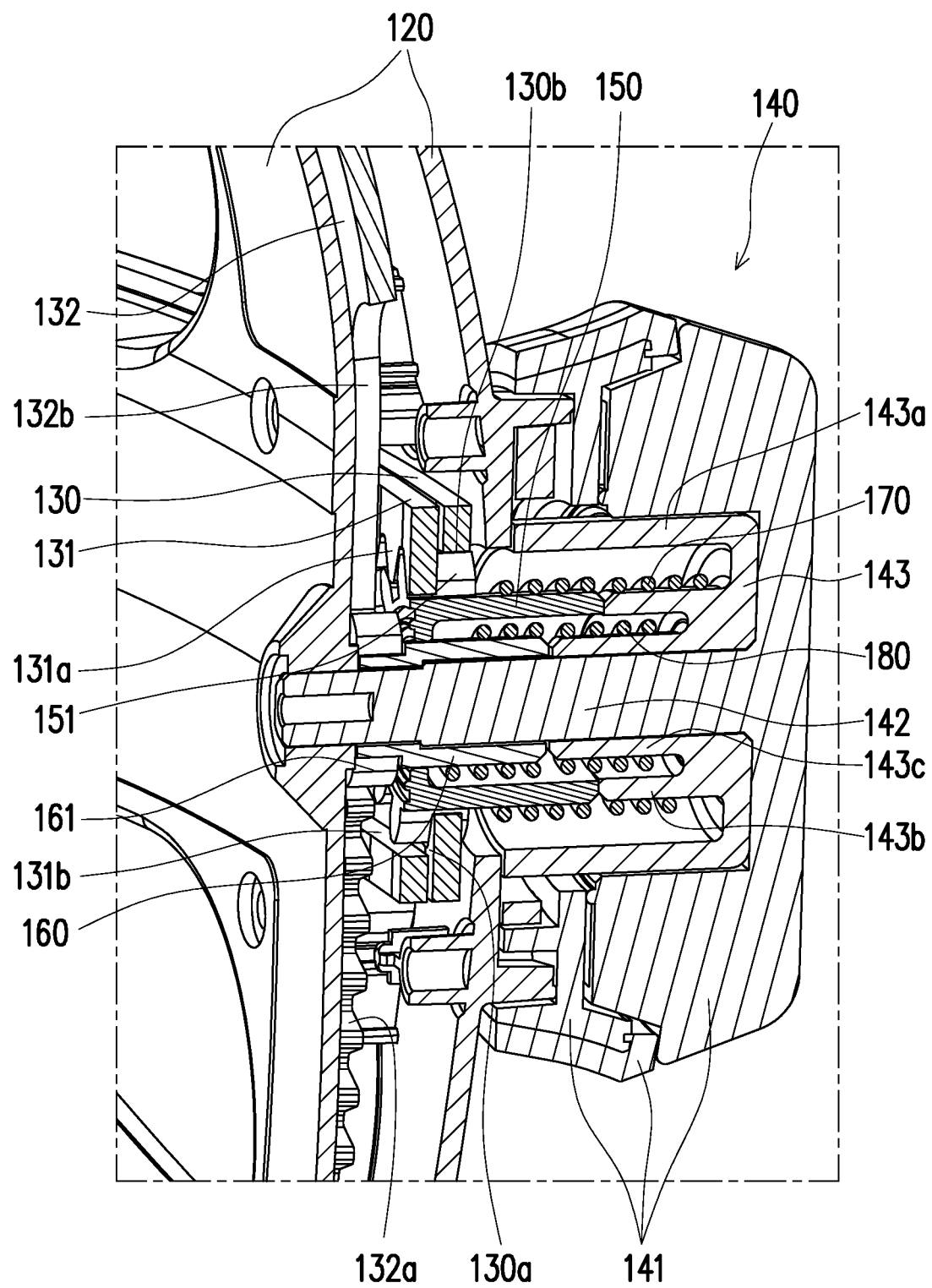
FIG. 5 is a partially enlarged schematic cross-sectional view of a head-mounted display according to an embodiment of the disclosure.

FIG. 1 is a schematic view of a head-mounted display according to an embodiment of the disclosure. FIG. 2 is a partially enlarged front view corresponding to a location of a knob in FIG. 1, where part of an internal structure of a head belt base 120 and part of an internal structure of a knob 140 are illustrated adopting dashed lines. FIG. 3 is a schematic partial view of the head-mounted display of FIG. 1 from another view angle, where a display host 110, part of a casing of the head belt base 120 facing toward the display host 110, part of a first lateral head belt 130, part of a second lateral head belt 131, and part of an auxiliary head belt 132 are omitted. FIG. 4 is an enlarged schematic view of the knob, a first driving component, a second driving component, and a positioning base of FIG. 3. FIG. 5 is a partially enlarged schematic cross-sectional view of a head-mounted display according to an embodiment of the disclosure.

With reference to FIG. 1 to FIG. 3, in this embodiment, a head-mounted display 100 may be worn by a user on the head, and may provide an image screen of a three-dimensional virtual environment, for the user to have an immersive sense of presence. Specifically, the head-mounted display 100 includes the display host 110, the head belt base 120, the first lateral head belt 130, the second lateral head belt 131, the auxiliary head belt 132, the knob 140, a first driving component 150, and a second driving component 160. The display host 110 is capable of logical operation, data access, and image display, and the display host 110 is connected to the head belt base 120 through the first lateral head belt 130, the second lateral head belt 131, and the auxiliary head belt 132.

The head belt base 120 is disposed opposite to the display host 110. When the user wears the head-mounted display 100 on the head, the display host 110 is located on the face of the user and covers the eyes of the user. In addition, the head belt base 120 is located at the back of the head of the user. The first lateral head belt 130 and the second lateral head belt 131 extend through the left and right sides of the head of the user, and the auxiliary head belt 132 extends through the top of the head of the user, accordingly improving stability and comfort of wearing the head-mounted display 100 by the user.

Furthermore, one end of the first lateral head belt 130 is slidably disposed on the head belt base 120, and another end of the first lateral head belt 130 is connected to the display host 110. One end of the second lateral head belt 131 is slidably mounted on the head belt base 120, and another end of the second lateral head belt 131 is connected to the display host 110. One end of the auxiliary head belt 132 is slidably mounted on the head belt base 120, and another end of the auxiliary head belt 132 is connected to the display host 110. For example, the first lateral head belt 130 and the second lateral head belt 131 are connected to the left and right sides of the display host 110, and the auxiliary head belt 132 is connected to the top of the display host 110 and is located between the first lateral head belt 130 and the second lateral head belt 131.

As shown in FIG. 3 and FIG. 5, in the head belt base 120, the first lateral head belt 130 is at least partially overlapped with the second lateral head belt 131, and the auxiliary head belt 132 is intersected with the second lateral head belt 131. The auxiliary head belt 132 is substantially perpendicular to the second lateral head belt 131, and the second lateral head belt 131 is located between the auxiliary head belt 132 and the first lateral head belt 130. On the other hand, an extension direction of the first lateral head belt 130 is parallel to an extension direction of the second lateral head belt 131, and an extension direction of the auxiliary head belt 132 is intersected with or perpendicular to the extension direction of the first lateral head belt 130 and the extension direction of the second lateral head belt 131.

With reference to FIG. 1, FIG. 3 and FIG. 5, in this embodiment, the knob 140, the first driving component 150, and the second driving component 160 are pivoted to the head belt base 120, and the head belt base 120 is located between the display host 110 and the knob 140. A section of the first lateral head belt 130 at which the first lateral head belt 130 is slidably disposed on the head belt base 120 is at least partially overlapped with a section of the second lateral head belt 131 at which the second lateral head belt 131 is slidably disposed on the head belt base 120, and the sections are mechanically coupled to the first driving component 150. Through the rotation of the first driving component 150 relative to the head belt base 120, the first lateral head belt 130 and the second lateral head belt 131 are synchronously driven by the first driving component 150 and slide relative to the head belt base 120 along two opposite directions.

On the other hand, the second driving component 160 passes through the section of the first lateral head belt 130 at which the first lateral head belt 130 is slidably disposed on the head belt base 120 and the section of the second lateral head belt 131 at which the second lateral head belt 131 is slidably disposed on the head belt base 120. In addition, second driving component 160 is mechanically coupled to a section of the auxiliary head belt 132 at which the auxiliary head belt 132 is slidably disposed on the head belt base 120. Through the rotation of the second driving component 160 relative to the head belt base 120, the auxiliary head belt 132 is driven by the second driving component 160 and slides relative to the head belt base 120. Moreover, a sliding direction of the auxiliary head belt 132 is intersected with or perpendicular to a sliding direction of the first lateral head belt 130 and a sliding direction of the second lateral head belt 131.

Specifically, by rotating the knob 140, the user may synchronously drive the first driving component 150 and the second driving component 160 to be rotated relative to the head belt base 120, so as to drive the first lateral head belt 130 and the second lateral head belt 131 through the first driving component 150 and drive the auxiliary head belt 132 through the second driving component 160. Accordingly, a length of the first lateral head belt 130, a length of the second lateral head belt 131, and a length of the auxiliary head belt 132 may synchronously adjusted, and a tightness of the head-mounted display 100 when being worn may be adjusted depending on personal needs. Therefore, the head-mounted display 100 has excellent operating convenience.

In this embodiment, the first lateral head belt 130 includes a first serration portion 130a slidably disposed on the head belt base 120, and the first serration portion 130a is located in the section of the first lateral head belt 130 at which the first lateral head belt 130 is slidably disposed on the head belt base 120. On the other hand, the second lateral head belt 131 includes a second serration portion 131a slidably disposed on the head belt base 120, and the second serration portion 131a is located in the section of the second lateral head belt 131 at which the second lateral head belt 131 is slidably disposed on the head belt base 120. For example, the section of the first lateral head belt 130 at which the first lateral head belt 130 is slidably disposed on the head belt base 120 has a first sliding groove 130b, and the first serration portion 130a is disposed in the first sliding groove 130b. On the other hand, the section of the second lateral head belt 131 at which the second lateral head belt 131 is slidably disposed on the head belt base 120 has a second sliding groove 131b at least partially overlapped with the first sliding groove 130*b*, and the second serration portion 131*a* is disposed in the second sliding groove 131*b*.

The first driving component 150 includes a first gear portion 151, and the first gear portion 151 is located in the first sliding groove 130*b* and the second sliding groove 131*b*. The first gear portion 151 is engaged with the first serration portion 130*a* and the second serration portion 131*a*. When the first serration portion 130*a* is rotated, the first serration portion 130*a* and the second serration portion 131*a* are driven by the first gear portion 151, sliding the first lateral head belt 130 and the second lateral head belt 131 relative to the head belt base 120 along two opposite directions.

The auxiliary head belt 132 includes an auxiliary serration portion 132*a* slidably disposed on the head belt base 120, and the auxiliary serration portion 132*a* is located in the section of the auxiliary head belt 132 at which the auxiliary head belt 132 is slidably disposed on the head belt base 120. For example, the section of the auxiliary head belt 132 at which the auxiliary head belt 132 is slidably disposed on the head belt base 120 has an auxiliary sliding groove 132*b* intersected with the second sliding groove 131*b*, and the auxiliary serration portion 132*a* is disposed in the auxiliary sliding groove 132*b*. The second driving component 160 includes a second gear portion 161. The second gear portion 161 passes through the first sliding groove 130*b* and the second sliding groove 131*b*, and is located in the auxiliary sliding groove 132*b*. The second gear portion 161 is engaged with the auxiliary serration portion 132*a*. When the second gear portion 161 is rotated, the auxiliary serration portion 132*a* is driven by the second gear portion 161, sliding the auxiliary head belt 132 relative to the head belt base 120.

As shown in FIG. 3 and FIG. 5, the first serration portion 130*a* is disposed opposite to the second serration portion 131*a*. For example, the first serration portion 130*a* is on the bottom and the second serration portion 131*a* is on the top, but not limited thereto. On the other hand, an extension direction of the auxiliary serration portion 132*a* is intersected with or perpendicular to an extension direction of the first serration portion 130*a* and an extension direction of the second serration portion 131*a*, and the extension direction of the first serration portion 130*a* is parallel to the extension direction of the second serration portion 131*a*.

With reference to FIG. 5, in a first state, the first driving component 150 and the second driving component 160 are each joined to the knob 140 to be rotated synchronously with the knob 140. The first driving component 150 drives the first lateral head belt 130 and the second lateral head belt 131, and the second driving component 160 drives the auxiliary head belt 132. Specifically, the head-mounted display 100 also includes a first unidirectional spring 170 and a second unidirectional spring 180. One end of the first unidirectional spring 170 is fixed to the knob 140, and another end of the first unidirectional spring 170 is sleeved on the first driving component 150. On the other hand, one end of the second unidirectional spring 180 is fixed to the knob 140, and another end of the second unidirectional spring 180 is sleeved on the second driving component 160.

In the first state, the first unidirectional spring 170 is tightened against the first driving component 150, linking the first driving component 150 with the knob 140. On the other hand, the second unidirectional spring 180 is tightened against the second driving component 160, linking the second driving component 160 with the knob 140. As shown in FIG. 5, the first unidirectional spring 170 surrounds the second unidirectional spring 180. In addition, the first driving component 150 surrounds the second driving component 160, that is to say, the second driving component 160 is disposed through the first driving component 150. In addition, the second unidirectional spring 180 is located between the first driving component 150 and the second driving component 160.

With reference to FIG. 1, FIG. 2, FIG. 4, and FIG. 5, in this embodiment, the knob 140 includes a knob body 141, a shaft portion 142 and a positioning base 143. Moreover, the knob body 141 is located on the side of the head belt base 120 facing away from the display host 110. The shaft portion 142 protrudes from the knob body 141 and is disposed through the head belt base 120 to serve as a rotation reference shaft of the knob body 141. On the other hand, the positioning base 143 is disposed on the knob body 141. The first driving component 150 is sleeved on the second driving component 160, and the shaft portion 142 is disposed through the positioning base 143 and the second driving component 160.

Furthermore, the positioning base 143 includes a first protruding ring 143*a*, a second protruding ring 143*b* surrounded by the first protruding ring 143*a*, and a third protruding ring 143*c* surrounded by the second protruding ring 143*b*. Besides, the second protruding ring 143*b* is located between the first protruding ring 143*a* and the third protruding ring 143*c*. One end of the first driving component 150 is in contact with the second protruding ring 143*b*. The first unidirectional spring 170 is disposed through the first driving component 150 and the second protruding ring 143*b*, and one end of the first unidirectional spring 170 is fixed to the second protruding ring 143*b*. In addition, the first unidirectional spring 170 is disposed in an annular groove between the first protruding ring 143*a* and the second protruding ring 143*b*.

One end of the second driving component 160 is in contact with the third protruding ring 143*c*. The second unidirectional spring 180 is sleeved on the second driving component 160 and the third protruding ring 143*c*, and one end of the second unidirectional spring 180 is fixed to the third protruding ring 143*c*. In addition, the second unidirectional spring 180 is disposed in an annular groove between the second protruding ring 143*b* and the third protruding ring 143*c*. The shaft portion 142 is disposed through the third protruding ring 143*c*, and the second protruding ring 143*b* separates the first unidirectional spring 170 from the second unidirectional spring 180.

In the first state, the first unidirectional spring 170 is tightened against the first driving component 150, linking the first driving component 150 with the second protruding ring 143*b*. Also, the second unidirectional spring 180 is tightened against the second driving component 160, linking the second driving component 160 with the third protruding ring 143*c*. The knob body 141 may be configured to drive the positioning base 143 to be rotated synchronously, such that the second protruding ring 143*b* drives the first driving component 150 to be rotated synchronously through the first unidirectional spring 170, and the third protruding ring 143*c* drives the second driving component 160 to be rotated synchronously through the second unidirectional spring 180.

With reference to FIG. 2 and FIG. 4, in this embodiment, the knob 140 also includes a protruding piece 144 (multiple protruding pieces schematically shown) protruding from the knob body 141 and surrounding the shaft portion 142. In addition, an outer wall surface 143*d* of the positioning base 143 (i.e., an outer wall surface of the first protruding ring 143*a*) is provided with a positioning elastic arm 143*e* (multiple positioning elastic arms schematically shown). For example, the number of the protruding pieces 144 is equal to the number of the positioning elastic arms 143e, and the protruding pieces 144 are in a one-to-one correspondence with the positioning elastic arms 143e. Furthermore, each positioning elastic arm 143e includes a passive portion 143f, an elastic arm portion 143g, and a pawl 143h. The passive portion 143f is fixed to the outer wall surface 143d, and the pawl 143h is connected to the passive portion 143f through the elastic arm portion 143g.

As shown in FIG. 4, each protruding piece 144 is located between the passive portion 143f and the pawl 143h of the corresponding positioning elastic arm 143e. When the knob body 141 is rotated along a counterclockwise direction, the protruding pieces 144 rotated with the knob body 141 is pushed against the passive portions 143f to drive the positioning base 143 to be rotated synchronously. On the contrary, when the knob body 141 is rotated along a clockwise direction, the protruding pieces 144 rotated with the knob body 141 is pushed against the pawls 143h to drive the positioning base 143 to be rotated synchronously.

As shown in FIG. 2, the head belt base 120 includes an internal-tooth ratchet 121 surrounding the positioning base 143, and each protruding piece 144 is located between the internal-tooth ratchet 121 and the corresponding positioning elastic arm 143e. The pawls 143h are engaged with the internal-tooth ratchet 121 to position the knob 140. When the knob body 141 is rotated along a counterclockwise direction, the protruding pieces 144 rotated with the knob body 141 is pushed against the pawls 143h, generating elastic deformation of the elastic arm portions 143g. When elastic deformation is generated on the elastic arm portions 143g, the pawls 143h depart from the internal-tooth ratchet 121, such that the positioning base 143 is smoothly pushed by the protruding pieces 144.

With reference to FIG. 2, FIG. 3, and FIG. 5, in a second state, the first driving component 150 is joined to the knob 140 to be rotated synchronously with the knob 140 and drive the first lateral head belt 130 and the second lateral head belt 131. However, the second driving component 160 is loosened from the knob 140 to stop being rotated and stop driving the auxiliary head belt 132. Furthermore, in the second state, the first unidirectional spring 170 is tightened against the first driving component 150, linking the first driving component 150 with the second protruding ring 143b. In addition, since the auxiliary head belt 132 cannot be slided and the second driving component 160 cannot be rotated, the third protruding ring 143c in rotation exerts a force on the second unidirectional spring 180, increasing an inner diameter of the second unidirectional spring 180, loosening the second unidirectional spring 180 from the second driving component 160.

In other words, when the knob 140 cannot drive the auxiliary head belt 132 through the second driving component 160, the second driving component 160 is loosened from the knob 140, such that the knob 140 may still drive the first lateral head belt 130 and the second lateral head belt 131 through the first driving component 150.

In a third state, the second driving component 160 is joined to the knob 140 to be rotated synchronously with the knob 140 and drive the auxiliary head belt 132. However, the first driving component 150 loosened from the knob 140 to stop being rotated and stop driving the first lateral head belt 130 and the second lateral head belt 131. Furthermore, in the third state, the second unidirectional spring 180 is tightened against the second driving component 160, linking the second driving component 160 with the third protruding ring 143c. In addition, since the first lateral head belt 130 and second lateral head belt 131 cannot be slided, and the first driving component 150 cannot be rotated, the second protruding ring 143b in rotation exerts a force on the first unidirectional spring 170, increasing an inner diameter of the first unidirectional spring 170, loosening the first unidirectional spring 170 from the first driving component 150.

In other words, when the knob 140 cannot drive the first lateral head belt 130 and the second lateral head belt 131 through the first driving component 150, the first driving component 150 is loosened from the knob 140, such that the knob 140 may still drive the auxiliary head belt 132 through the second driving component 160.

Based on the above design, if the length (or tightness) of the first lateral head belt 130 and the second lateral head belt 131 has been adjusted, the user may still adjust the length (or tightness) of the auxiliary head belt 132. On the contrary, if the length (or tightness) of the auxiliary head belt 132 has been adjusted, the user may still adjust the length (or tightness) of the first lateral head belt 130 and the second lateral head belt 131. In addition, with the above design, it is also possible to prevent damage to the mechanism caused by excessive rotation/adjustment.

In summary of the foregoing, in the head-mounted display of the disclosure, by rotating the knob, the user may synchronously drive the first lateral head belt, the second lateral head belt, and the auxiliary head belt, and synchronously adjust the length of the first lateral head belt, the length of the second lateral head belt, and the length of the auxiliary head belt. Accordingly, the tightness of the head-mounted display when being worn may be adjusted depending on personal needs. Therefore, the head-mounted display of the disclosure has excellent operating convenience.

In the first state, the first driving component and the second driving component are each joined to the knob to be rotated synchronously with the knob. The first driving component drives the first lateral head belt and the second lateral head belt, and the second driving component drives the auxiliary head belt. In the second state, the first driving component is joined to the knob to be rotated synchronously with the knob and drives the first lateral head belt and the second lateral head belt. However, the second driving component is loosened from the knob to stop being rotated and stop driving the auxiliary head belt. In the third state, the second driving component is joined to the knob to be rotated synchronously with the knob and drives the auxiliary head belt. However, the first driving component is loosened from the knob to stop being rotated and stop driving the first lateral head belt and the second lateral head belt. In other words, when the knob cannot drive the first lateral head belt and the second lateral head belt through the first driving component, the first driving component is loosened from the knob, such that the knob may still drive the auxiliary head belt through the second driving component. On the contrary, when the knob cannot drive the auxiliary head belt through the second driving component, the second driving component is loosened from the knob, such that the knob may still drive the first lateral head belt and the second lateral head belt through the first driving component. Based on the above design, if the length (or tightness) of the first lateral head belt and the second lateral head belt has been adjusted, the user may still adjust the length (or tightness) of the auxiliary head belt. On the contrary, if the length (or tightness) of the auxiliary head belt has been adjusted, the user may still adjust the length (or tightness) of the first lateral head belt and the second lateral head belt. In addition, with the above design, it is also possible to prevent damage to the mechanism caused by excessive rotation/adjustment.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A head-mounted display, comprising:
a display host;
a head belt base disposed opposite to the display host;
a first lateral head belt, wherein one end of the first lateral head belt is slidably disposed on the head belt base, and another end of the first lateral head belt is connected to the display host;
a second lateral head belt, wherein one end of the second lateral head belt is slidably disposed on the head belt base and is overlapped with the first lateral head belt, and another end of the second lateral head belt is connected to the display host;
an auxiliary head belt, wherein one end of the auxiliary head belt is slidably disposed on the head belt base and intersected with the second lateral head belt, and another end of the auxiliary head belt is connected to the display host;
a knob pivoted to the head belt base, wherein the head belt base is located between the display host and the knob;
a first driving component pivoted to the head belt base and coupled to the first lateral head belt and the second lateral head belt, wherein the first driving component is joined to the knob to be rotated synchronously with the knob, or the first driving component is loosened from the knob to stop being rotated;
a second driving component pivoted to the head belt base and coupled to the auxiliary head belt, wherein the second driving component is joined to the knob to be rotated synchronously with the knob, or the second driving component is loosened from the knob to stop being rotated;
first unidirectional spring, wherein one end of the first unidirectional spring is fixed to the knob, and another end of the first unidirectional spring is sleeved on the first driving component; and
a second unidirectional spring, wherein one end of the second unidirectional spring is fixed to the knob, and another end of the second unidirectional spring is sleeved on the second driving component,
when the first driving component is joined to the knob to be rotated synchronously with the knob, the second driving component is loosened from the knob to stop being rotated, wherein the another end of the first unidirectional spring is tightened against the first driving component and the another end of the second unidirectional spring is loosened from the second driving component due to a increasement of an inner diameter of second unidirectional spring,
when the second driving component is joined to the knob to be rotated synchronously with the knob, the first driving component is loosened from the knob to stop being rotated, wherein the another end of the second unidirectional spring is tightened against the second driving component and the another end of the first unidirectional spring is loosened from the first driving component due to a increasement of an inner diameter of first unidirectional spring.

2. The head-mounted display as described in claim 1, wherein the first lateral head belt comprises a first serration portion slidably disposed on the base of the head belt, the second lateral head belt comprises a second serration portion slidably disposed on the head belt base, the first driving component comprises a first gear portion, and the first gear portion is engaged with the first serration portion and the second serration portion.

3. The head-mounted display as described in claim 1, wherein the auxiliary head belt comprises an auxiliary serration portion slidably disposed on the head belt base, the second driving component comprises a second gear portion, and the second gear portion is engaged with the auxiliary serration portion.

4. The head-mounted display as described in claim 1, wherein the first unidirectional spring surrounds the second unidirectional spring, and the first driving component surrounds the second driving component.

5. The head-mounted display as described in claim 1, wherein the second unidirectional spring is located between the first driving component and the second driving component.

6. The head-mounted display as described in claim 1, wherein the knob comprises a knob body, a shaft portion, and a positioning base, and the shaft portion protrudes from the knob body and is disposed through the head belt base, wherein the positioning base is disposed on the knob body, the first driving component is sleeved on the second driving component, and the shaft portion is disposed through the positioning base and the second driving component.

7. The head-mounted display as described in claim 6, wherein the knob further comprises a protruding piece protruding from the knob body and surrounding the shaft portion, an outer wall surface of the positioning base is provided with a positioning elastic arm, and the positioning elastic arm comprises a passive portion, an elastic arm portion, and a pawl, wherein the passive portion is fixed to the outer wall surface, the pawl is connected to the passive portion through the elastic arm portion, and the protruding piece is rotated with the knob body and is pushed against the passive portion or the pawl to drive the positioning base to be rotated with the knob body.

8. The head-mounted display as described in claim 7, wherein the head belt base comprises an internal-tooth ratchet surrounding the positioning base, the pawl is engaged with the internal-tooth ratchet, and the protruding piece is located between the internal-tooth ratchet and the positioning elastic arm.

9. The head-mounted display as described in claim 6, wherein the positioning base comprises a first protruding ring, a second protruding ring surrounded by the first protruding ring, and a third protruding ring surrounded by the second protruding ring, wherein the second protruding ring is located between the first protruding ring and the third protruding ring,
one end of the first driving component is in contact with the second protruding ring, wherein the first unidirectional spring is sleeved on the first driving component and the second protruding ring, and one end of the first unidirectional spring is fixed to the second protruding ring, and
one end of the second driving component is in contact with the third protruding ring, wherein the second unidirectional spring is sleeved on the second driving component and the third protruding ring, and one end of the second unidirectional spring is fixed to the third protruding ring.

* * * * *